Patented Oct. 11, 1949

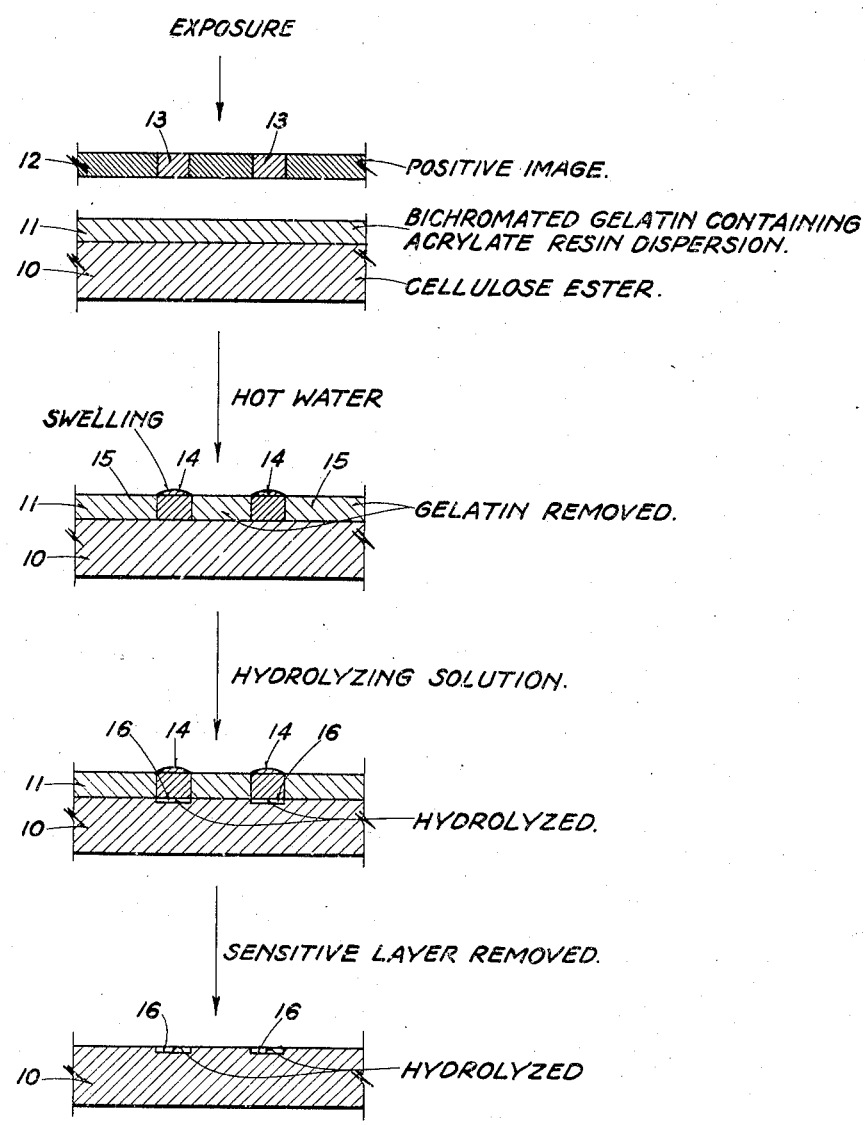

2,484,431

UNITED STATES PATENT OFFICE 2,484,431

METHOD OF MAKING HYDROLYZED CELLULOSE ACETATE PRINTING PLATES

Henry C. Staehle and Charles F. Amering, Rochester, N. Y., assignors to Eastman Kodak Company, Rochester, N. Y., a corporation of New Jersey Application July 17, 1948, Serial No. 39,218

5 Claims. (Cl. 95—5.4)

This invention relates to lithography and particularly to a method of making a photolithographic printing plate.

It is known that lithographic plates may be made from cellulose ester films by hydrolyzing or saponifying the film imagewise. The plate thus prepared has hydrolyzed areas and unhydrolyzed areas, the former repelling and the latter accepting greasy ink.

We have discovered a simple and convenient method of making a hydrolyzed cellulose ester printing plate which involves the use of a novel sensitizing medium.

Our novel method comprises using a bichromated hydrophilic colloid, for example, gelatin, containing an aqueous colloidal dispersion of a water-insoluble, soft acrylate resin as the sensitizing medium for a substantially fully esterified cellulose organic acid ester plate. The advantages of this method will be fully described below.

The accompanying drawing shows sectional views of a cellulose ester printing plate at various stages in our process.

The cellulose ester sheet used in our process to make the lithographic printing plate is a hydrolyzable cellulose organic acid ester such as cellulose acetate, cellulose acetate propionate or cellulose acetate butyrate. The cellulose ester should be substantially fully esterified and preferably should contain not more than about 1% of hydroxyl groups. A preferred ester is cellulose triacetate containing approximately 42.5% of acetyl groups.

The sensitizing medium applied to the cellulose ester plate consists of a bichromated hydrophilic colloid such as a bichromated low grade gelatin containing an aqueous colloidal dispersion of a water-insoluble, soft acrylate resin. A material of this type is described in Staehle U. S. application Serial No. 558,346, filed October 12, 1944. These acrylate dispersions consist of a resin such as polymethyl acrylate or polyethyl acrylate dispersed in water and containing a dispersing agent such as the sodium salt of an alkyl aryl polyether sulfonate, the resin comprising from 25 to 50% by weight of the aqueous dispersion. They are sold under the trade names Rhoplex or Acrysol. The resin dispersion is mixed with the gelatin or other colloid in amounts of from 1 part of gelatin, to 1 to 3 parts of resin dispersion, and in the present process higher proportions of resin dispersion may be used, for example, up to 15 times the weight of the gelatin.

The sensitizing mixture of bichromated gelatin and resin dispersion is coated on the cellulose ester sheet and after drying, is exposed to a positive image from the sensitive side, the exposure being sufficient to strike through to the support. The element is then treated with hot water, for example, by immersing in hot water for a minute or two. By "hot water," we mean water at a temperature of from 100 to 212° F.

Hot water causes swelling and softening of the exposed areas of the sensitive layer. Because the gelatin has been hardened by the exposure in these areas, it is not washed out but is merely swollen by the action of the water. In the unexposed areas the gelation has not been hardened and the hot water dissolves the gelatin and other soluble constituents out of the unexposed areas. At the same time, the resin particles in the unexposed areas coalesce to form a continuous film well bonded to the support. The support is therefore protected by a layer of water-insoluble resin where the sensitive layer was not exposed. The element is then immersed in a hydrolyzing solution, for example, a solution of sodium hydroxide in ethyl alcohol and water for from 1 to 15 minutes. The exposed areas of the sensitive layer containing the swollen gelatin has practically no resistance to the penetration of the hydrolyzing solution while the areas which correspond to the unexposed parts offer substantial resistance to the hydrolyzing solution because the coating of resin has coalesced and bonded to the support. After sufficient time for hydrolysis the film is rinsed in water and the sensitive layer removed with a solvent such as toluene. The solvent dissolves the resin and takes out the remaining gelatin and other constituents, leaving the cellulose ester sheet having hydrolyzed and unhydrolyzed areas in accordance with the image in the sensitive layer.

Our invention will be further described by reference to the accompanying drawing which shows in sectional view a film at various stages in our process.

As shown therein, a support 10, for example, of cellulose triacetate having an acetyl content of about 42.5 and 0.0055 inch thick, is coated with a thin layer 11 of bichromated gelatin containing an aqueous colloidal dispersion of an acrylate resin. After drying, this coating is exposed to light under a positive image 12 having clear areas 13 which allow transmission of light.

The element is then treated with hot water for a sufficient time to swell the exposed areas as shown at 14 and to remove the gelatin from the unexposed areas 15.

The element is then treated with a hydrolyzing solution which penetrates only the areas 14 because of the swollen gelatin which they contain. This causes hydrolysis of the support at 16 but not in the unexposed regions beneath the portions 15 of the sensitive layer.

The sensitive layer is then removed with a suitable solvent leaving the hydrolyzed portions 16 which repel the printing ink, the remaining areas of the plate accepting the ink and serving as the printing areas.

Our invention will be further illustrated by reference to the following specific example.

A cellulose triacetate film support consisting of 0.0055-inch thick cellulose triacetate containing about 42.5% acetyl was coated with a layer of sensitizing material from the following solution:

Example 1

| | | |
|---|---|---|
| Gelatin | g | 60 |
| Water | cc | 120 |
| Aqueous dispersion of acrylate resin | cc | 60 |
| Water | cc | 60 |
| Ammonium bichromate (20% solution) | cc | 60 |
| Tartrazine (10% solution) | cc | 20 |

The sensitive layer was dried, exposed to a positive and the element was immersed in hot water at a temperature of 160° F., for one minute. The film was then removed from the water and immersed in a hydrolyzing solution having the following composition:

| | | |
|---|---|---|
| Sodium hydroxide | grams | 5 |
| Ethyl alcohol | cc | 40 |
| Water | cc | 55 |

After immersion in the hydrolyzing bath for about 5 minutes, the film was removed, rinsed in water and the sensitive layer was then removed with toluene. The plate which resulted had hydrolyzed areas where the sensitive layer was exposed and the remaining areas were unhydrolyzed.

In place of the sensitizing solution described in the above example, the following may be used.

Example 2

| | | |
|---|---|---|
| Gelatin | g | 60 |
| Water | cc | 120 |
| Aqueous dispersion of acrylate resin | cc | 175 |
| Water | cc | 175 |
| Ammonium bichromate (20% solution) | cc | 60 |
| Tartrazine (10% solution) | cc | 30 |

A plate made as described above shows remarkably fine rendition of detail so that it is not difficult to obtain 300-line halftone dots. At the same time there is unquestionably great differentiation between the ink receptive and the water-carrying areas. The fact that it is unnecessary to remove the exposed areas as with most bichromated gelatin sensitive compositions is a convenience and advantage in simplifying the process. It is also possible to work with a broad range of gelatin to resin ratios in the particular sensitizing composition which we use and this means that the sensitizer and the manner of treatment are not highly critical.

It will be understood that modifications may be made in our process within the scope of the appended claims.

We claim:

1. The method of making a photolithographic printing plate which comprises coating a substantially fully esterified cellulose organic acid ester support with a layer of bicromated hydrophilic colloid containing an aqueous colloidal dispersion of a water-insoluble, soft, acrylate resin, exposing the colloid layer to light under an image, treating the exposed layer with hot water to swell the colloid in the exposed regions of the layer and to remove the colloid from the unexposed regions of the layer without removing the resin, treating the layer with a hydrolyzing solution to hydrolyze the portions of the cellulose ester support beneath the exposed regions of the colloid layer and removing all of the colloid layer and resin from the support.

2. The method of making a photolithographic printing plate which comprises coating a substantially fully esterified cellulose acetate support with a layer of bichromated gelatin containing an aqueous dispersion of a water-insoluble, soft, acrylate resin, exposing the gelatin layer to light under an image, treating the exposed layer with hot water to swell the gelatin in the exposed regions of the layer and to remove the gelatin from the unexposed regions of the layer without removing the resin, treating the layer with a hydrolyzing solution to hydrolyze the celluose acetate support beneath the exposed regions of the gelatin layer and removing all gelatin and resin from the support.

3. The method of making a photolithographic printing plate which comprises coating a substantially fully esterified cellulose acetate support with a layer of bichromated gelatin containing an aqueous dispersion of polyethyl acrylate resin, exposing the gelatin layer to light under a positive image, treating the exposed layer with hot water to swell the gelatin in the exposed regions of the layer and to remove the gelatin from the unexposed regions of the layer without removing the resin, treating the layer with a hydrolyzing solution to hydrolyze the cellulose acetate support beneath the exposed regions of the gelatin layer and removing all gelatin and resin from the support.

4. The method of making a photolithographic printing plate which comprises coating a substantially fully esterified cellulose acetate support with a layer of bichromated gelatin containing an aqueous dispersion of polyethyl acrylate resin, the amount of resin dispersion being from 1 to 15 times the amount of gelatin, exposing the gelatin layer to light under a positive image, treating the exposed layer with hot water to swell the gelatin in the exposed regions of the layer and to remove the gelatin from the unexposed regions of the layer without removing the resin, treating the layer with a hydrolyzing solution to hydrolyze the cellulose acetate support beneath the exposed regions of the gelatin layer and removing all gelatin and resin from the support.

5. The method of making a photolithographic printing plate which comprises coating a substantially fully esterified cellulose acetate support with a layer of bichromated gelatin containing an aqueous dispersion of polyethyl acrylate resin, exposing the gelatin layer to light under a positive image, treating the exposed layer with hot water to swell the gelatin in the exposed regions of the layer and to remove the gelatin from the unexposed regions of the layer without removing the resin, treating the layer with an alcoholic sodium hydroxide hydrolyzing solution to hydrolyze the cellulose acetate support beneath the exposed regions of the gelatin layer and removing all gelatin and resin from the support.

HENRY C. STAEHLE.
CHARLES F. AMERING.

No references cited.